(12) United States Patent
Miao et al.

(10) Patent No.: US 8,422,962 B2
(45) Date of Patent: Apr. 16, 2013

(54) METHOD AND ARRANGEMENT IN A COMMUNICATION SYSTEM

(75) Inventors: Qingyu Miao, Beijing (CN); Rui Fan, Beijing (CN); Xinyu Gu, Beijing (CN); Rong Hu, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 141 days.

(21) Appl. No.: 12/747,614

(22) PCT Filed: Dec. 14, 2007

(86) PCT No.: PCT/SE2007/051005
§ 371 (c)(1),
(2), (4) Date: Sep. 16, 2010

(87) PCT Pub. No.: WO2009/078762
PCT Pub. Date: Jun. 25, 2009

(65) Prior Publication Data
US 2011/0003561 A1    Jan. 6, 2011

(51) Int. Cl.
*H04B 1/00* (2006.01)
*H04B 7/00* (2006.01)

(52) U.S. Cl.
USPC .................. 455/69; 455/127.2; 455/522

(58) Field of Classification Search ............ 455/69, 455/127.2, 522; 370/318, 320, 342; 375/141, 375/142
See application file for complete search history.

(56) References Cited

U.S. PATENT DOCUMENTS

| | | | | |
|---|---|---|---|---|
| 7,266,096 B2 * | 9/2007 | Miya et al. | ............. | 370/322 |
| 7,561,893 B2 * | 7/2009 | Moulsley et al. | ............. | 455/522 |
| 7,573,860 B2 * | 8/2009 | Zhao et al. | ............. | 370/342 |
| 7,586,977 B2 * | 9/2009 | Usuda et al. | ............. | 375/146 |
| 8,160,029 B2 * | 4/2012 | Dominique et al. | ........... | 370/335 |
| 2005/0009551 A1 * | 1/2005 | Tsai et al. | ............. | 455/522 |
| 2006/0034226 A1 * | 2/2006 | Gu et al. | ............. | 370/332 |

FOREIGN PATENT DOCUMENTS

| | | |
|---|---|---|
| GB | 2 408 420 | 5/2005 |
| WO | WO 01/24402 | 4/2001 |
| WO | WO 2007/097960 A1 | 8/2007 |

OTHER PUBLICATIONS

International Search Report for PCT/SE2008/051005, mailed Nov. 18, 2008.
3GPP TS 25.214 V8.0.0 (Nov. 2007), 3rd Generation Partnership Project; Technical Specification Group Radio Access Network; Physical layer procedures (FDD), Release 8, Chapters 5.1.2-5.1.2.5A.
3GPP TS 25.213 v7.4.0 (Nov. 2007), 3rd Generation Partnership Project; Technical Specification Group Radio Access Network, Spreading and modulation (FDD), Release 7, Chapters 4.2.1.2.
English Translation of Chinese Office Action issued in Application No. 200780101893.7 dated Jul. 26, 2012.
Chinese Office Action issued in Application No. 200780101893.7 dated Nov. 12, 2012 with English Translation.

* cited by examiner

*Primary Examiner* — Ping Y Hsieh
*Assistant Examiner* — Chung-Tien Yang
(74) *Attorney, Agent, or Firm* — Nixon & Vanderhye, P.C.

(57) ABSTRACT

Methods and arrangements for generating adjustment commands in a node. The adjustment commands adjust the transmission power of radio signals. The radio signals are sent over at least a first channel and a second channel. The adjustment is performed by adjusting a gain factor. The gain factor is associated with the relation between a first transmission power level of a first channel and a second transmission power level of a second channel.

11 Claims, 5 Drawing Sheets

METHOD AND ARRANGEMENT IN A COMMUNICATION SYSTEM

This application is the U.S. national phase of International Application No. PCT/SE2007/051005 filed 14 Dec. 2007 which designated the U.S., the entire contents of which is hereby incorporated by reference.

TECHNICAL FIELD

The technology disclosed herein relates to methods and arrangements in a communication system, in particular to methods and arrangements generating adjustment commands for adjusting the transmission power of radio signals by adjusting a gain factor.

BACKGROUND

In communication systems based on e.g. Code Divisional Multiple Access (CDMA), outer loop power control is used to meet the desired quality of service targets. The outer loop power control may be implemented both in the user equipment to meet the downlink quality target and also in the base station to meet the uplink quality target. In wireless communication networks, the downlink is the transmission path from the base station to the user equipment, and the uplink is the transmission path from the user equipment to the base station. It is important that the outer loop power control is able to maintain the desired quality of service target despite varying radio conditions, which is often the case in wireless communication systems.

The following describes various technical aspects related to inner loop power control, outer loop power control and its convergence in CDMA systems. In particular the methods and devices described herein relates to Wideband Code Division Multiple Access (WCDMA) but may be equally applicable to other CDMA based technologies such as e.g. cdma 2000 because power control, both inner and outer loop, is the hallmark of CDMA access technology. The methods may also be implemented in a Fraction High Speed Downlink Packet Data Access (F-HSDPA).

In CDMA systems the inner loop power control, also called fast power control, runs every time slot, which is typically less than 1 ms (e.g. 0.67 ms in WCDMA). In WCDMA the inner loop power control runs in both uplink and downlink. The fast inner-loop power control adjusts the transmit power of the sender towards a specific Signal to Interference and noise Ratio (SIR) target at the receiver. The aim of the uplink and downlink inner loop power controls is to counter the effect of fast fading, while maintaining the desired SIR target. In the uplink it also ensures to compensate for the near-far problem, so that the signal received from the users far away in the cell are not swamped out by the stronger signal. During every slot the user equipment estimates the SIR on some known reference or pilot symbols and compares it with some SIR target corresponding to the given service (e.g. certain Bit Error Rate (BER) requirements, spreading factor used etc.). In WCDMA, Downlink SIR is measured on Dedicated Physical Control Channel (DPCCH), which comprises pilots and Transmitter Power Control (TPC) commands for uplink power control. If the estimated SIR is less than the SIR target then the user equipment generates UP command, otherwise it generates DOWN command; in response the base station will increase (in case of UP) or decrease (in case of DOWN) its downlink transmit power.

The aim of the outer loop power control is to adjust the SIR target value used by the inner loop power control as previously explained, while maintaining a certain link quality. The quality target is the ultimate quality target measure, which is set by the network and is expected from the user equipment to consistently maintain this target to ensure the desired quality of service is met throughout the call session. Due to the varying radio link conditions e.g. user mobility, fast fading etc, the mapping between the SIR target and BER changes over time. This is a key point as it requires constant adjustment of the SIR target to maintain the desired value of BER. This mechanism of adjusting the SIR target is also referred to as outer loop power control, quality control or outer loop scheme.

In systems such as enhanced uplink (EUL) version of WCDMA, the outer loop power control is configured to fulfill a quality target based on number of transmission attempts i.e.: "after x targeted transmissions, the residual error should be y %".

The uplink outer loop power control for enhanced uplink channels adjusts the uplink DPCCH SIR target so the residual error rate after the stipulated maximum number of transmissions is fulfilled.

If the transmission is not successfully decoded after the stipulated maximum number of transmissions, the SIR target is increased by e.g. 0.5 dB. For every successfully decoded transmission, the corresponding SIR target is decreased by a factor inversely proportional to the error probability, e.g. about 0.01 dB if the error rate is 2%.

The transmission of data over the air in a wireless communication system is performed by using a plurality of different physical channels, for example Dedicated Physical Control CHannel (DPCCH), Dedicated Physical Data CHannel (DP-DCH), Enhanced Dedicated Physical Control CHannel (E-DPCCH) and Enhanced Dedicated Physical Data CHannel (E-DPDCH). The power consumptions of these are related to each other by power offsets, i.e. $\beta$-values or gain factor relative the power level of the DPCCH.

However, the gain factor used in actual data transmission may be inaccurate, which in turn will affect the overall system performance. Either the reference gain factors obtained through simulations or the method to calculate other gain factors may result in inaccurate gain factors. E.g. when the gain factor is lower than required, more transmission attempts are required to guarantee the successful transmission. Since current EUL outer loop power control is based on transmission attempts, this actually means the SIR target is increased and more power is allocated to DPCCH. However, this is undesired.

The current outer loop power control according to EUL WCDMA increases the DPCCH SIR target when the number of transmission attempts is larger than TA target. This means that all other channels with a power offset to the DPCCH, such as the E-DPDCH, will also increase their transmit power.

However, in many cases, the reason for not fulfilling the TA target is due to too low power on the data channel, E-DPDCH, not due to too low power on the control channel DPCCH.

Since the DPCCH is continuously transmitted while E-DPDCH is transmitted more intermittently, increasing the SIR target and power on the DPCCH causes unnecessarily high interference.

Moreover, in a situation with bad coverage and high power usage on the user equipment, DPCCH will "steal" power from the data channel E-DPDCH.

Further on, there is also a problem with the constant power offsets for different transport block size sizes. It is difficult for the network to set the power offset and the enhanced data channel transport format combination (E-TFC) to match the TA target exactly. For example if the power offset is too low to fulfill the TA target, the DPCCH SIR will be increased until the TA target is fulfilled. Since it may be difficult to know beforehand what power offset can match the wanted TA target, this will most likely lead to an unwanted adjustment of the DPCCH SIR target, and thereby lead to a possibly unwanted interference increase or a too low DPCCH SIR target.

SUMMARY

The technology disclosed herein aims at obviating or reducing at least some of the above mentioned disadvantages associated with existing technology.

It is an object of the technology disclosed herein to provide a mechanism in a node that decreases the transmission power consumption and improves the capacity in a wireless communication system.

The object is achieved by a method for generating adjustment commands in a sending node. The adjustment commands adjust the transmission power of radio signals sent to a receiving node. The radio signals are sent over at least a first channel and a second channel. The adjustment is performed by adjusting a gain factor. The gain factor is associated with the relation between a first transmission power level of a first channel and a second transmission power level of a second channel. The method further comprises obtaining a first quality value associated with the first channel. Also, the method comprises determining the difference between the obtained first quality value and a first quality target value associated with the first channel. Further yet, the method comprises adjusting the gain factor based on the determined difference between the obtained quality value and the quality target value. Also, the method comprises generating an adjustment command for adjusting the transmission power of the first channel based on the adjusted gain factor.

The object is also achieved by a method for generating adjustment commands in a receiving node. The adjustment commands adjust the transmission power of radio signals received from a sending node. The radio signals are sent over at least a first channel and a second channel. The adjustment is performed by adjusting a gain factor. The gain factor is associated with the relation between a first transmission power level of a first channel and a second transmission power level of a second channel. The first channel and the second channel are used for sending a signal from the sending node to the receiving node. The method comprises obtaining a first quality value associated with the first channel. Also, the method comprises determining the difference between the obtained first quality value and a first quality target value associated with the first channel. Further yet, the method comprises adjusting the gain factor based on said determined difference between the obtained quality value and the quality target value. Still further, the method comprises generating an adjustment command for adjusting the transmission power of the first channel based on the adjusted the gain factor.

The object is also achieved by an arrangement in a sending node for generating adjustment commands. The adjustment commands are generated for adjusting the transmission power of radio signals sent to a receiving node. The radio signals are sent over at least a first channel and a second channel. The adjustment is performed by adjusting a gain factor. The gain factor is associated with the relation between a first transmission power level of a first channel and a second transmission power level of a second channel. The first channel and the second channel are used for sending a signal between the sending node and a receiving node. The arrangement comprises an obtaining unit, adapted to obtain a first quality value associated with the first channel. Further, the arrangement comprises a determination unit, adapted to determine the difference between the obtained first quality value and a first quality target value associated with the first channel. Also, the arrangement comprises an adjustment unit, adapted to adjust the gain factor based on said determined difference between the obtained quality value and the quality target value. Yet further, the arrangement also comprises a generation unit, adapted to generate an adjustment command for adjusting the transmission power of the first channel based on the adjusted the gain factor.

The object is also achieved by an arrangement in a receiving node for generating adjustment commands. The adjustment commands adjust the transmission power of radio signals sent from a sending node. The radio signals are sent over at least a first channel and a second channel. The adjustment is performed by adjusting a gain factor. The gain factor is associated with the relation between a first transmission power level of a first channel and a second transmission power level of a second channel. The first channel and second channel are used for sending a signal from the sending node and the receiving node. The arrangement comprises a first obtaining unit. The first obtaining unit is adapted to obtain a first quality value associated with the first channel. Also, the arrangement comprises a determination unit, adapted to determine the difference between the obtained first quality value and a first quality target value associated with the first channel. Further, the arrangement comprises an adjustment unit, adapted to adjust the gain factor based on said determined difference between the obtained quality value and the quality target value. Further yet, the arrangement comprises a generator unit, adapted to generate an adjustment command for adjusting the transmission power of the first channel based on the adjusted the gain factor.

Through the present methods and arrangements, the transmit power of a node is utilized in a more efficient way as the quality of the data channel is guaranteed by itself through the adjustment of gain factors not related to the control channel. The situation that poor data channel quality result into SIR target increase, which in turn may result in even worse data channel as more power may be taken by the control channel would be avoided.

Thus an advantage of the present methods and arrangements is that an improved power regulation for radio signals is achieved, which saves energy resources.

BRIEF DESCRIPTION OF THE DRAWINGS

The technology disclosed herein will now be described more in detail in relation to the enclosed drawings, in which.

DETAILED DESCRIPTION

The technology disclosed herein is defined as a method and an arrangement which may be put into practice in the embodiments described below.

Figure 1:
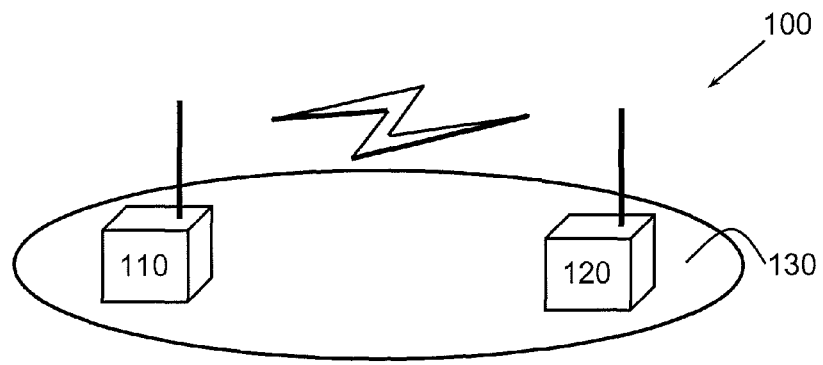
FIG. 1 is a block diagram illustrating embodiments of a wireless communication network.

FIG. 1 depicts a sending node 110 communicating with a receiving node 120 within a cell 130 in a wireless communication system 100.

In some embodiments, the sending node 110 may be a user equipment such as a mobile cellular radiotelephone, a Personal Digital Assistant (PDA), a laptop, a computer or any similar arrangement adapted for radio communication. The receiving node 120 may be a base station, a wireless communications station, a fixed station, a control station, a repeater or a similar arrangement for radio communication or any other kind of device capable of communicate radio resources.

However, the situation may as well be the opposite, such as in some other embodiments, wherein the sending node 110 may be a base station, a wireless communications station, a fixed station, a control station, a repeater or a similar arrangement for radio communication or any other kind of device capable of communicate radio resources, and the receiving node 120 a user equipment such as a mobile cellular radiotelephone, a Personal Digital Assistant (PDA), a laptop, a computer or any similar arrangement for radio communication.

The wireless communication network 100 may also comprise a control node. The control node may be e.g. a Radio Network Controller. The Radio Network Controller is a governing element in the wireless communication network 100, which may be responsible for control of base stations e.g. the receiving node 120, which may be connected to the Radio Network Controller. The Radio Network Controller may carry out radio resource management, some of the mobility management functions and may be the point where encryption is done before user data is sent to and from the sending node 110 and/or the receiving node 120.

The wireless communication system 100 may be based on technologies such as (for example) Code Division Multiple Access (CDMA), Wideband Code Division Multiple Access (WCDMA), and CDMA 2000 etc.

Radio signals are sent from the sending node 110 over a radio link and are received by the receiving node 120. The power of the signal, which may be too high or too low to be suitable for communication, is adjustable by the receiving node 120 by e.g. running an inner loop power control, also called fast power control. The inner loop power control may run in both on signals sent from the sending node 110 to the receiving node 120, e.g. as uplink signals or downlink signals. The aim of uplink and downlink inner loop power controls are inter alia to counter the effect of fast fading, while maintaining a desired SIR target. It also ensures to compensate for the near-far problem, so that a signal received from a user far away in the cell is not swamped out by a stronger signal.

The receiving node 120 may estimate a SIR value e.g. on some known reference signals such as (for example) pilot symbols and compare it with some SIR target corresponding to a given quality of service target, e.g., certain BLER/BER requirements etc.

In e.g. WCDMA, SIR may be measured on dedicated physical control channel (DPCCH), which DPCCH comprises pilots and TPC commands for uplink power control. If the measured SIR is less than SIR target then the inner loop power control at the receiving node 120 may generate UP command and send it to the sending node 110, and if the measured SIR is more than SIR target then the inner loop power control at the receiving node 120 may generate DOWN command and send it to the sending node 110. In response, the sending node 110 will increase, in case of UP command, or decrease, in case of DOWN command, its downlink transmit power.

An outer loop power control is used by the receiving node 120 to meet the desired quality of service targets. The outer loop power control may be implemented both in the base station to meet the uplink quality target and in the user equipment to meet the downlink quality target. It is important that despite varying radio conditions, which is often the case in wireless communication systems 100, the outer loop is able to maintain the desired quality of service target.

The outer loop power control may be used to maintain a certain link quality. The quality target may be set by the network 100 and it is expected from the sending node 110 to consistently maintain this target to ensure the desired quality of service is met throughout the call session. The value of the quality target may depend upon the type of service, such as speech, packet data, video data etc, which in turn impacts the SIR target used for inner loop power control. Thus, an adequate power level for providing the quality target of the radio link is easily achieved, during normal signal radio signal conditions.

Figure 2:
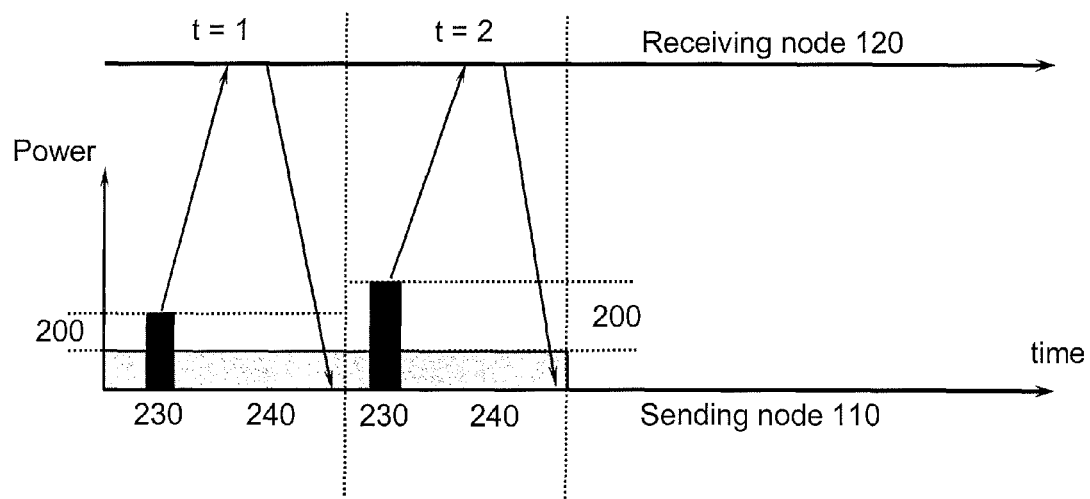
FIG. 2 is a block diagram illustrating signalling.

FIG. 2 is a block diagram illustrating signaling between the sending node 110 and the receiving node 120 at two different time moments, t=1 and t=2, according to some embodiments of the present method. The signaling may be made over a plurality of channels, such as a first channel 230 and a second channel 240. The first channel 230 may be a data channel, such as (for example) E-DPDCH. The second channel 240 may be a control channel such as (for example) DPCCH. The adjustment of the transmission power level of the signals sent over e.g. the first channel 230 and the second channel 240 from the sending node 110 to the receiving node 120 is made by adjusting a gain factor 200. The gain factor 200 is the difference between the transmit power of the channels 230, 240, such as the first channel 230 and the second channel 240.

In the illustrated scenario, the gain factor 200 at t=2 has been increased in comparison with the gain factor 200 at t=1. Thus, consequently, the transmit power of the first channel 230 has been increased accordingly at the time t=2.

The adjustment of the gain factor 200 may be made by the receiving node 120, but it may also be done in the sending node 110.

An advantage of the present method, as illustrated by FIG. 2, is that the transmission power of the first channel 230 may be adjusted by adjusting the gain factor 200, without simultaneously adjusting the transmit power level of the second channel 240.

Figure 3:
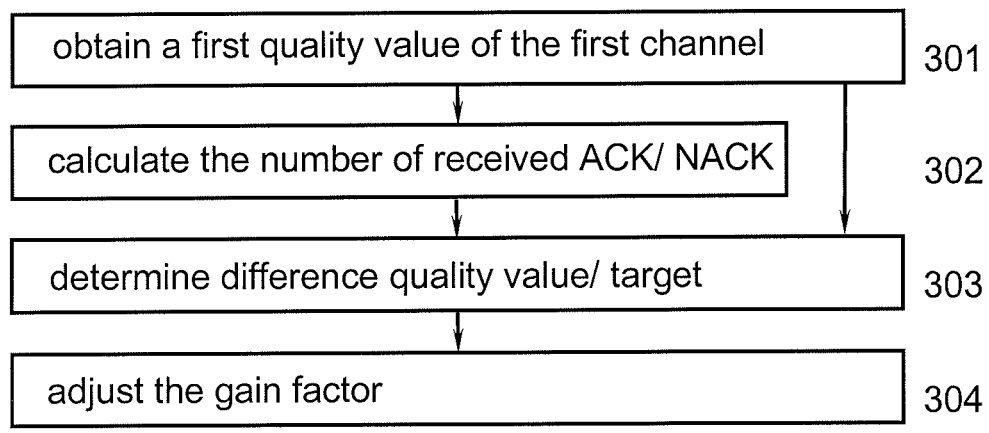
FIG. 3 is a flow chart illustrating embodiments of method steps.

FIG. 3 is a flowchart illustrating a method in a sending node 110 for generating adjustment commands. The adjustment commands are generated for a adjusting the transmission power of radio signals sent to a receiving node 120. The radio signals are sent to a receiving node 120 over at least a first channel 230 and a second channel 240. The first channel 230 may be a data channel, such as (for example) E-DPDCH. The second channel 240 may be a control channel such as (for example) DPCCH. Further, the adjustment is performed by adjusting a gain factor 200. The gain factor 200 is associated with the relation between a first transmission power level of a first channel 230 and a second transmission power level of a second channel 240. The signal may comprise data sent with a certain transport block size. The transport block size may vary for different data. Also the transport block size may influence the gain factor 200 according to some embodiments, such that different gain factors 200 may be used for different transport formats.

To appropriately generate an adjustment command for a sending node 110, the method may comprise a number of steps 301-304. It is however to be noted that some of the described method steps are optional and only comprised within some embodiments. Further, it is to be noted that the method steps 301-304 may be performed in any arbitrary chronological order and that some of them, e.g. step 301 and step 303, or even all steps may be performed simultaneously or in an altered or even completely reversed chronological order. The method comprises the steps of:

Step 301

The sending node 110 obtains a first quality value associated with the first channel 230. According to some embodiments, this step is performed by receiving one or more acknowledgement (ACK) or non-acknowledgement (NACK), sent from the receiving node 120, indicating that the signal, previously has been received correctly or erroneously, respectively. The one or more acknowledgement (ACK) or non-acknowledgement (NACK) may concern a plurality of signals representing data or a data block.

The acknowledgement (ACK) and/or non-acknowledgement (NACK) may be received from the receiving node 120.

Step 302

Step 302 is optional. According to some embodiments, the sending node 110 calculates the number of received acknowledgement (ACK) and/or non-acknowledgement (NACK) during a certain predetermined time period. The time period may be of arbitrary length, e.g. fractions of a second or a number of seconds. Thus, according to some embodiments, a statistical survey may be made, counting and summing up the number of acknowledgements (ACK) and/or non-acknowledgements (NACK) during a certain time period.

Step 303

The sending node 110 determines the difference between the obtained first quality value and a first quality target value associated with the first channel 230. According to some embodiments, this step comprises determining the difference between the number of received acknowledgements (ACK) and a threshold value. The threshold value may have any arbitrary size, such as being one acknowledgement.

According to some embodiments, this step comprises determining the difference between the number of received non-acknowledgements (NACK) and a threshold value. The threshold value may have any arbitrary size, such as being one non-acknowledgement.

However, according to some embodiments, a statistical survey may have been made in the optional step 302. For these embodiments, the threshold value may be expressed in a rate e.g. three received non-acknowledgements (NACK) in one second.

Step 304

The sending node 110 adjusts the gain factor 200 based on the determined difference between the obtained quality value and the quality target value.

According to some embodiments, the gain factor 200 may be decreased if the sending node 110 receives an acknowledgement (ACK) from the receiving node 120, indicating that the previously sent signal, sent from the sending node 110 to the receiving node 120, has been correctly received.

According to some embodiments, the gain factor 200 is increased if the sending node 110 receives a non-acknowledgement (NACK) from the receiving node 120, indicating that a previously sent signal, sent from the sending node 110 to the receiving node 120, has been erroneously received.

According to some embodiments, the gain factor 200 is based on the determined difference between the computed number of received acknowledgement (ACK) and/or non-acknowledgement (NACK) during a certain predetermined time period and a threshold limit value. According to these embodiments, the limit may be set e.g. to three received non-acknowledgements (NACK) in one second. If the limit is exceeded, the gain factor 200 may be increased. Thus, according to some embodiments, the sending node 110 may compile the statistics of ACKs and NACKs and then adjust the gain factor 200 based on $N_{nack}/(N_{ack}+N_{nack})$, where $N_{ack}$ is the number of transmitted ACKs within a certain measurement period, while $N_{nack}$ is the number of transmitted NACKs during such measurement period.

According to some embodiments, the gain factor 200 ($\Delta\beta$) may be decreased with a step size which is smaller than the step size used when the gain factor 200 may is increased.

Thus the step size may be set to, as a non-limiting example: $\Delta\beta/3=1$, when increasing the gain factor 200, and $$\Delta\beta = \frac{1}{(1 - BLERtarget)},$$

when decreasing the gain factor 200, according to some embodiments.

Through some embodiments, the transmission power of the sending node 110 is utilized in a more efficient way as the quality of the first channel 230, or data channel, is guaranteed by it self through the adjustment of gain factors 200, which are not directly related to the second channel 240, or control channel such as (for example) DPCCH. The situation that poor data transmission due to poor first channel 230 quality result into SIR target increase, which in turn may result in even worse propagation conditions for the first channel 230 as more power may be taken by the second channel 240 would be avoided.

Figure 4:
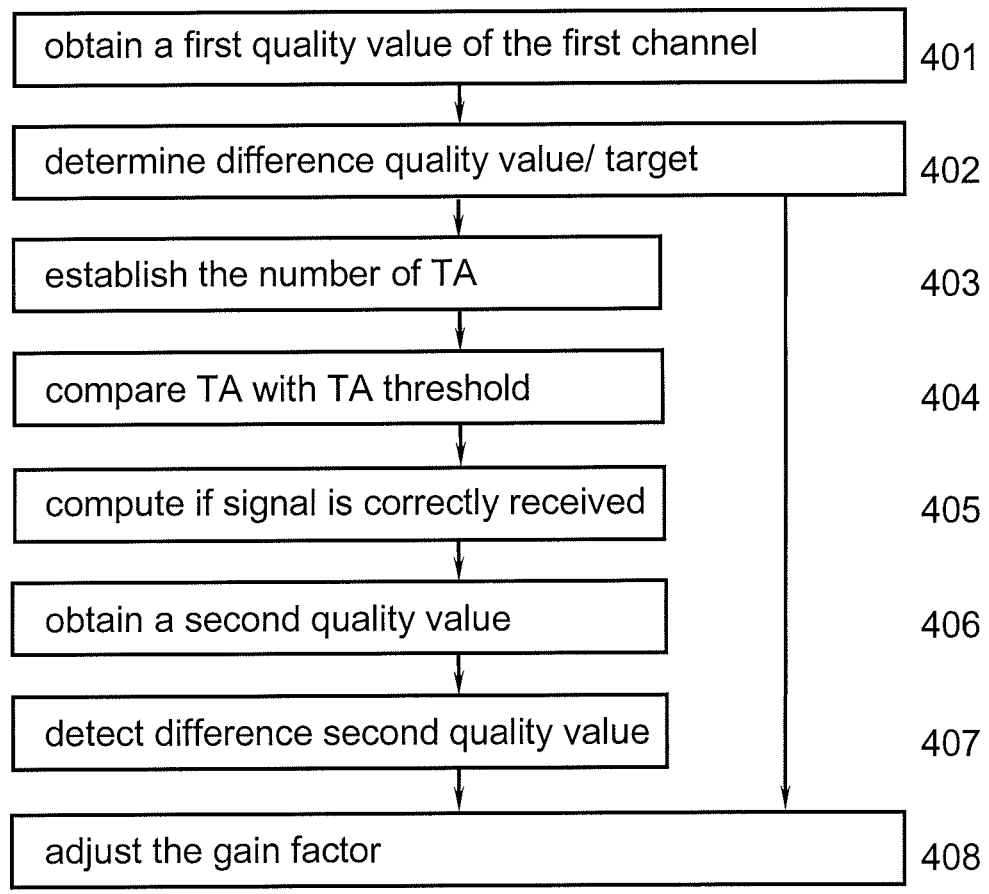
FIG. 4 is a flow chart illustrating embodiments of method steps.

FIG. 4 is a flowchart illustrating a method in the receiving node 120 for generating adjustment commands. The adjustment commands are generated for adjusting the transmission power of radio signals. The radio signals are received from the sending node 110 over at least the first channel 230 and the second channel 240. The adjustment is performed by adjusting the gain factor 200. The gain factor 200 is associated with the relation between a first transmission power level of the first channel 230 and the second transmission power level of the second channel 240. The first channel 230 and second channel 240 are used for sending a signal from the sending node 110 to the receiving node 120.

The signal may comprise data sent with a certain transport block size. The transport block size may vary for different data. Also the transport block size may influence the gain factor 200 according to some embodiments.

To appropriately generate an adjustment command for the sending node 110, the method may comprise a number of steps 401-408. It is however to be noted that some of the described method steps are optional and only comprised within some embodiments. Further, it is to be noted that the method steps 401-408 may be performed in any arbitrary chronological order and that some of them, e.g. step 401 and step 406, or even all steps may be performed simultaneously or in an altered or even completely reversed chronological order. The method comprises the steps of:

Step 401

The receiving node 120 obtains a first quality value associated with the first channel 230. The first quality value may be based on any arbitrary error rate calculation scheme such as (for example) Frame Error Ratio (FER), Block Error Ratio (BLER), Bit Error Ratio (BER) or any other suitable measure such as outage probability. Thus the quality target used according to some embodiments may be based on bit, block or frame error rate, where the bit, block or frame error rate is measured using e.g. Cyclic Redundancy Check (CRC). However, the quality target may also in some embodiments be based on TPC command error and the corresponding downlink quality may be measured on received TPC commands.

The step of obtaining a quality value of the first channel 230 may in some embodiments be performed by making an estimation of the quality value of the first channel 230. It may also according to some embodiments be performed by receiving a quality value of the first channel 230 from another node.

According to some embodiments, the receiving node 120 may measure the block error rate using $N_{err}/(N_{corr}+N_{err})$, where $N_{corr}$ is the number of correctly received transport block within a certain measurement period, and $N_{err}$ is the number of erroneously received transport block in such measurement period.

Step 402

The receiving node 120 determines the difference between the obtained first quality value and a first quality target value associated with the first channel 230.

Such difference may be determined by comparing the obtained first quality value of the first channel 230 with a quality target value of the first channel 230. The quality target value of the first channel 230 may according to some embodiments have different values for different services. The value of the quality target value may depend upon the type of service, which in turn impacts the SIR target used for inner loop power control, as explained above. As a non limiting example, 1% BLER target may be used for speech, 10% BLER target may be used for packet data, 0.1 BLER % may be used for video telephony and so on.

Step 403

In the optional step 403, the receiving node 120 establish, according to some embodiments, the number of transmission attempts the sending node 110 has made to send a signal to the receiving node 120. The optional step of obtaining a number of transmission attempts of the second signal over the first channel 230 may be performed by counting the number of transmission attempts, according to some embodiments. The number of transmission attempts may also according to some embodiments be received from another node comprised within the wireless communication network 100.

Step 404

Step 404 is optional. According to some embodiments, the number of transmission attempts may be compared with a transmission attempts threshold value. The transmission attempts threshold value may according to some embodiments have different values for data blocks of different transport block size.

The transmission attempts threshold value may according to some embodiments have different values for different services.

Step 405

In the optional step 405, the receiving node 120 computes, according to some embodiments, if the signal sent over the first channel 230 from the sending node 110 is correctly received. The correctness of the signal may be estimated by an arbitrary data correctness algorithm such as e.g. CRC.

Step 406

Step 406 is optional. The receiving node 120 obtains, according to some embodiments, a second quality value associated with the second channel 240. According to some embodiments, the second quality value associated with the second channel 240 may be a SIR value. According to some embodiments, the SIR value may be estimated by the receiving node 120.

Step 407

Step 407 is optional. The receiving node 120 detects, according to some embodiments, a difference between the obtained second quality value and a quality target value associated with the second channel. According to some embodiments, the second quality value may be a SIR value and the quality target value may be a SIR target value.

Step 408

The receiving node 120 adjusts the gain factor 200 based on said determined difference between the obtained quality value and the quality target value.

According to some embodiments, the gain factor 200 may be decreased by a certain step if e.g. the second quality value, such as e.g. a SIR value, exceeds a threshold, such as e.g. a SIR target value, and if the signal comprising transport blocks of data is correctly received within the allowed number of transmission attempts, the gain factor 200 may be decreased by a certain step size. According to some embodiments, the step size may be 1/(1−BLER). Otherwise, the gain factor 200 may be increased. According to some embodiments, the gain factor 200 may be increased by the step size 1.

According to some embodiments, the gain factor 200 (Δβ) may be decreased with a step size which is smaller than the step size used when the gain factor 200 may is increased.

Thus the step size may be set to, as a non-limiting example: Δβ=1, when increasing the gain factor 200, and $$\Delta\beta = \frac{1}{(1 - BLERtarget)},$$

when decreasing the gain factor 200, in accordance with some embodiments.

Through some embodiments, the transmission power of the sending node 110 is utilized in a more efficient way as the quality of the first channel 230, or data channel, is guaranteed by it self through the adjustment of gain factors 200, which are not directly related to the second channel 240, or control channel such as e.g. DPCCH. The situation that poor data transmission due to poor first channel 230 quality result into SIR target increase, which in turn may result in even worse propagation conditions for the first channel 230 as more power may be taken by the second channel 240 may thus be avoided.

Figure 5:
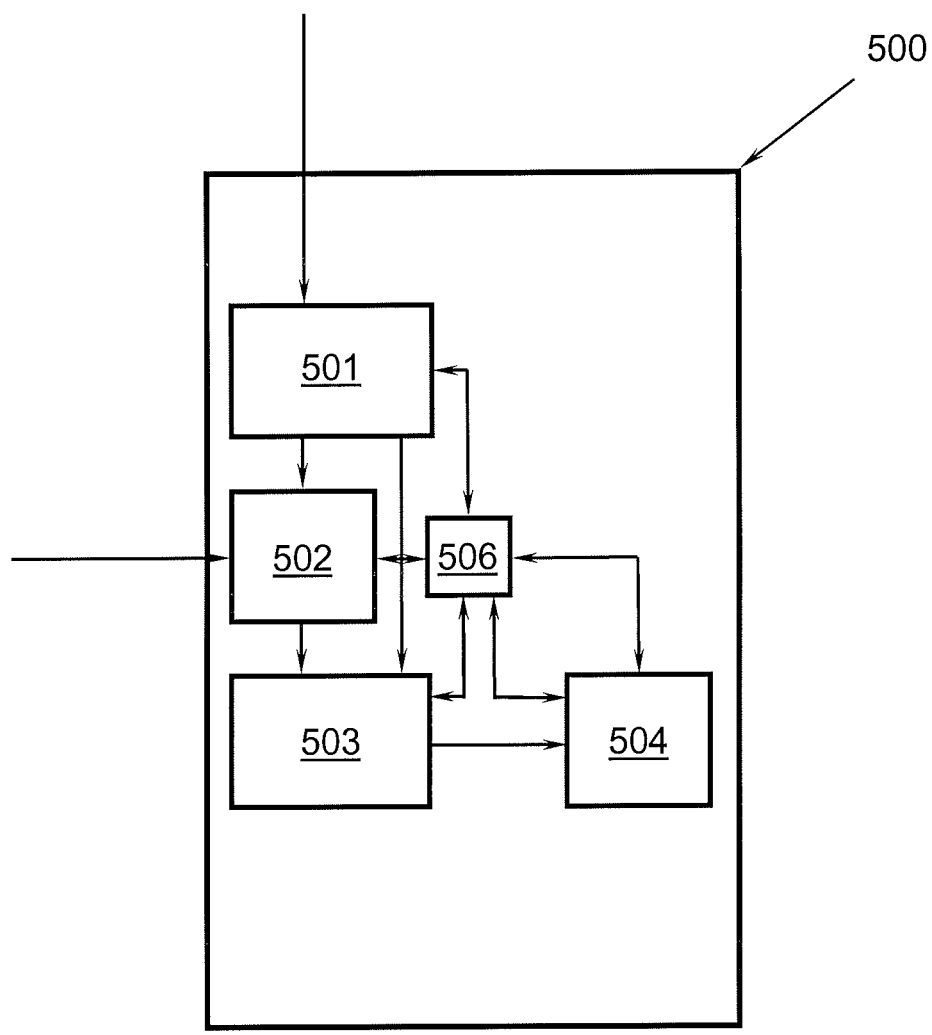
FIG. 5 is a block diagram illustrating embodiments of an arrangement in a node.

FIG. 5 is a block diagram illustrating embodiments of an arrangement 500 in a sending node 110. To perform the method steps 301-304 in the sending node 110, for generating adjustment commands for adjusting the transmission power of radio signals sent over a radio link to a receiving node 120, the sending node 110 comprises an arrangement 500 as depicted in FIG. 5.

The sending node arrangement 500 is adapted to generate adjustment commands for adjusting the transmission power of radio signals. The radio signals are sent to a receiving node 120 over at least a first channel 230 and a second channel 240. The radio signals may comprise data in transport blocks of different sizes. Further, the adjustment is performed by adjusting a gain factor 200. The gain factor 200 is associated with the relation between a first transmission power level of a first channel 230 and a second transmission power level of a second channel 240. The first channel 230 and second channel 240 are used for sending a signal between the sending node 110 and a receiving node 120.

The sending node arrangement 500 comprises an obtaining unit 501, adapted to obtain a first quality value associated with the first channel 230.

According to some embodiments, the sending node arrangement 500 may comprise a calculator unit 502. The optional calculator unit 502 may be adapted to calculate the number of received acknowledgement (ACK) and/or non-acknowledgement (NACK) during a certain time period. The time period may be predetermined.

Further, the sending node arrangement 500 comprises a determination unit 503. The determination unit 503 is adapted to determine the difference between the obtained first quality value and a first quality target value associated with the first channel 230.

The sending node arrangement 500 also comprises an adjustment unit 504. The adjustment unit 504 is adapted to adjust the gain factor 200 based on said determined difference between the obtained quality value and the quality target value.

The sending node arrangement 500 may also, according to some embodiments, comprise a processor unit 506. The processor unit 506 is adapted to process data, perform computations and communicate with other units comprised within the sending node arrangement 500.

Any, some or all of the units 501, 502, 503, 504 and/or 506 may be comprised within the same physical unit or units, according to some embodiments. Thus the units 501, 502, 503, 504 and/or 506 are to be seen rather as entities providing a certain specified function, not with necessity comprised within separate physical units.

Figure 6:
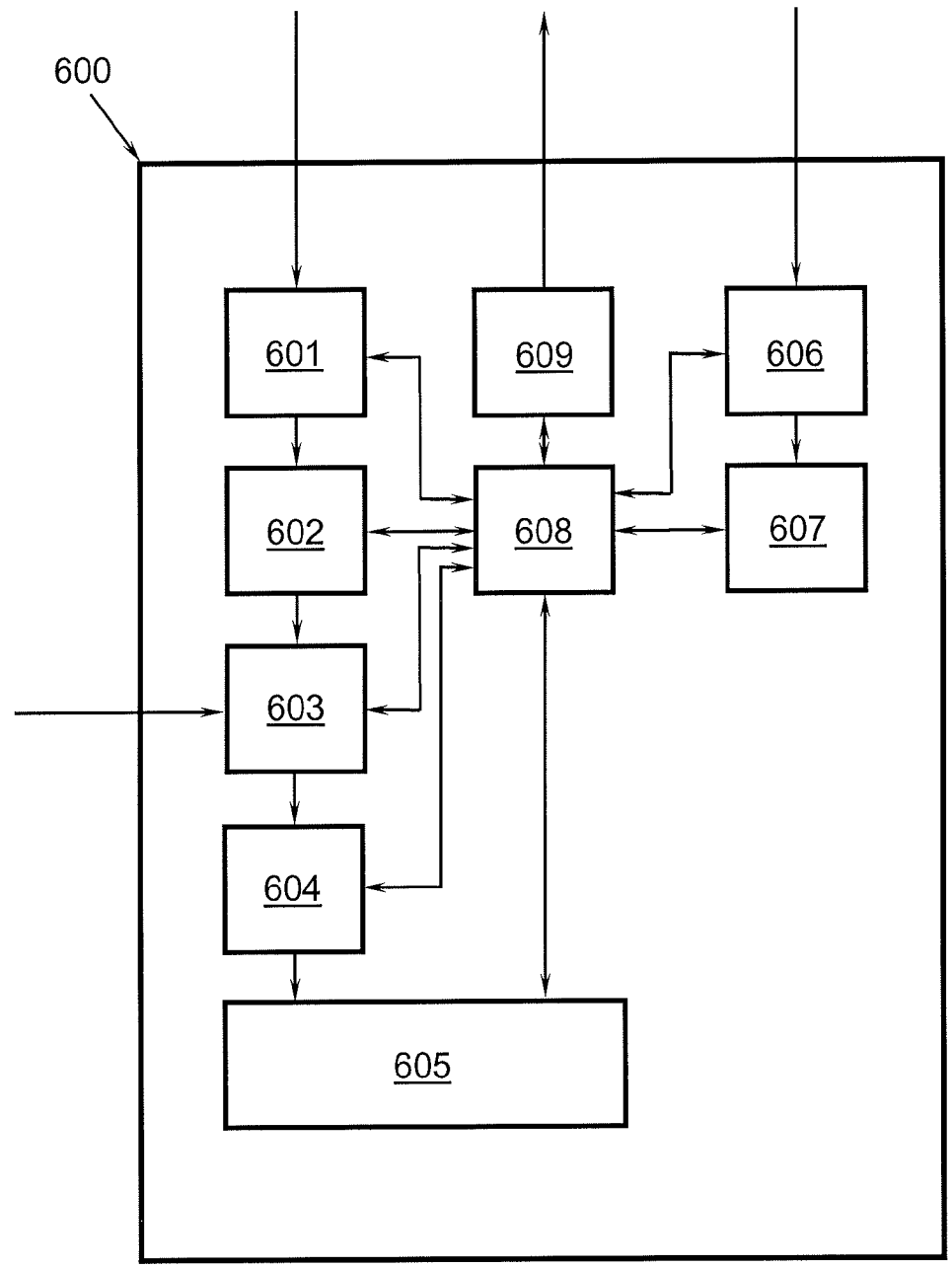
FIG. 6 is a block diagram illustrating embodiments of an arrangement in a node.

FIG. 6 is a block diagram illustrating embodiments of an arrangement 600 in a receiving node 120. To perform the method steps 401-408 in the receiving node 120, for generating adjustment commands for adjusting the transmission power of radio signals sent over a radio link from a sending node 110, the receiving node 110 comprises an arrangement 600 as depicted in FIG. 6.

The arrangement 600 is situated in a receiving node 120. The receiving node arrangement 600 is adapted to generate adjustment commands, for adjusting the transmission power of radio signals. The radio signals are sent from a sending node 110 over at least a first channel 230 and a second channel 240. The adjustment of the transmission power is performed by adjusting a gain factor 200. The gain factor 200 is associated with the relation between a first transmission power level of a first channel 230 and a second transmission power level of a second channel 240. The first channel 230 and the second channel 240 are used for sending signals from the sending node 110 to the receiving node 120.

The receiving node arrangement 600 comprises a first obtaining unit 601, adapted to obtain a first quality value associated with the first channel 230.

Further, the receiving node arrangement 600 comprises a determination unit 602, adapted to determine the difference between the obtained first quality value and a first quality target value associated with the first channel 230.

Also, according to some embodiments, the receiving node arrangement 600 may comprise a third obtaining unit 603. The third obtaining unit 603 may further be adapted to obtain the number of transmission attempts the sending node 110 has made to send a signal to the receiving node 120.

Also, according to some embodiments, the receiving node arrangement 600 may comprise a comparison unit 604, adapted to compare the obtained number of transmission attempts with a transmission attempts threshold value.

According to some embodiments, the receiving node arrangement 600 comprises a computation unit 605, adapted to compute if the data sent over the first channel 230 from the sending node 110 is correctly received.

According to some embodiments, the receiving node arrangement 600 also comprises a second obtaining unit 606, adapted to obtain a second quality value associated with the second channel 240.

The receiving node arrangement 600 comprises, according to some embodiments, a detection unit 607. The optional detection unit 607 may be adapted to detect a difference between the obtained second quality value and a quality target value associated with the second channel 240.

Also, the receiving node arrangement 600 comprises an adjustment unit 608, adapted to adjust the gain factor 200 based on said determined difference between the obtained quality value and the quality target value.

Also, according to some optional embodiments, the receiving node arrangement 600 comprises a sending unit 609, adapted to emit a signal to another node.

Any, some or all of the units 601, 602, 603, 604, 605, 606, 607, 608 and/or 609 may be comprised within the same physical unit or units, according to some embodiments. Thus the units 601, 602, 603, 604, 605, 606, 607, 608 and/or 609 are to be seen rather as entities providing a certain specified function, not with necessity comprised within separate physical units.

The present methods and arrangements may with particular advantage be used for technologies such as an Enhanced Uplink (EUL) or High-Speed Uplink Packet Access (HSUPA) in the wireless communication system 100, as the present methods and arrangements implements a fast and accurate mechanism to adjust the transmission power levels on a plurality of channels 230, 240, by adjusting the gain factor 200.

The description of the embodied methods and arrangements has focused mainly and by means of example only, on the uplink power control in the receiving node 120. The present methods and arrangements may however also be performed e.g. partly in the base station controller or radio network controller (RNC), for example when the sending node 110 is in soft handover.

Further by means of example and in order to simplify the comprehension, the term SIR has been consistently used in this text when describing a Signal to noise and Interference Ratio, which is the ratio between the level of a desired signal to the level of background noise and signal disturbance. The higher the ratio, the less obtrusive is the background noise. However, there exist other acronyms which are sometimes used to describe the same or a similar ratio, like e.g. the Signal to Noise Ratio (SNR or S/N), Signal to Noise and Interference Ratio (SNIR), Carrier to interference Ratio (CIR), Signal to Interference and Noise Ratio (SINR) or an inversion of the ratio, like Interference to Signal Ratio, (ISR). Any of these or similar ratios may be used in the context of this description instead of the SIR.

The methods for adjusting the transmission power of radio signals sent over a first channel 230 and a second channel 240 from a sending node 110 according to some embodiments may be implemented through one or more processors, such as the processor 506 in the sending node arrangement 500, depicted in FIG. 5; or the processor 608 in the receiving node arrangement 600 depicted in FIG. 6, together with computer program code for performing the functions of the methods. The program code mentioned above may also be provided as a computer program product, for instance in the form of a data carrier carrying computer program code for performing the method according to the technology disclosed herein when being loaded into the sending node 110 and/or the receiving node 120. The data carrier may be a CD ROM disc, a memory stick, or any other medium such as a disk or tape that can hold machine readable data. The computer program code may furthermore be provided as pure program code on a server and downloaded to the sending node 110 and/or the receiving node 120 remotely.

While the methods and arrangements described in this document are susceptible to various modifications and alternative forms, specific embodiments thereof are shown by way of example in the drawings and are herein described in detail. It should be understood, however, that there is no intent to limit the present methods and arrangements to the particular forms disclosed, but on the contrary, the methods and arrangements are to cover all modifications, equivalents, and alternatives falling within the spirit and scope of the methods and arrangements as defined by the claims.

Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present.

Furthermore, "connected" or "coupled" as used herein may include wirelessly connected or coupled. As used herein, the term "and/or" includes any and all combinations of one or more of the associated listed items.

Unless otherwise defined, all terms including technical and scientific terms used herein have the same meaning as commonly understood by one of ordinary skill in the art to which these methods and arrangements belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For purposes of illustration, embodiments of the present methods and arrangements are described herein in the context of a user equipment and a base station. It will be understood, however, that the present methods and arrangements are not limited to such embodiments and may be embodied generally as any electronic device that includes radio signal propagation means thereon.

The invention claimed is:

1. A method in a sending node for generating adjustment commands, for adjusting the transmission power of radio signals sent to a receiving node over at least a data channel and a control channel, the adjustment is performed by adjusting a gain factor, which gain factor is associated with the relation between a first transmission power level of the data channel and a second transmission power level of the control channel, the method comprising:
    obtaining a first quality value associated with the data channel, by receiving one or more acknowledgement (ACK) or non-acknowledgement (NACK), sent from the receiving node, indicating that the signal, previously has been received correctly or erroneously, respectively,
    obtaining a second quality value associated with the control channel;
    determining a first difference between the obtained first quality value and a first quality target value associated with the data channel,
    determining a second difference between the obtained second quality value and a second quality target value associated with the control channel,
    adjusting the gain factor based on the first difference and the second difference.

2. The method according to claim 1, wherein the gain factor is decreased if the sending node receives an acknowledgement (ACK) from the receiving node, indicating that the previously sent signal, sent from the sending node to the receiving node, has been correctly received.

3. The method according to claim 1, wherein the gain factor is increased if the sending node receives a non-acknowledgement (NACK) from the receiving node, indicating that a previously sent signal, sent from the sending node to the receiving node, has been erroneously received.

4. The method according to claim 1, comprising the further step of:
    calculating the number of received acknowledgement (ACK) and/or non-acknowledgement (NACK) during a certain predetermined time period, and wherein the step of adjusting the gain factor is based on the determined difference between the computed number of received acknowledgement (ACK) and/or non-acknowledgement (NACK) during a certain predetermined time period and a threshold limit value.

5. The method according to claim 1, wherein the first quality target value is set to different value levels for different services.

6. The method according to claim 1, wherein the gain factor is adjusted in dependence of the transport block size.

7. The method according to claim 1, wherein the gain factor is adjusted only for transport blocks of the previously used transport block size.

8. The method according to claim 1, wherein the sending node is represented by a base station.

9. The method according to claim 1, wherein the sending node is represented by a user equipment.

10. An arrangement in a sending node for generating adjustment commands, for adjusting the transmission power of radio signals sent to a receiving node over at least a data channel and a control channel, the adjustment is performed by adjusting a gain factor, which gain factor is associated with the relation between a first transmission power level of the data channel and a second transmission power level of the control channel, which data channel and control channel are used for sending a signal between the sending node and a receiving node, the arrangement comprises:
    an obtaining unit, adapted to obtain:
        (1) a first quality value associated with the data channel, by receiving one or more acknowledgement (ACK) or non-acknowledgement (NACK), sent from the receiving node, indicating that the signal, previously has been received correctly or erroneously, respectively, and
        (2) a second value associated with the control channel;
    a determination unit, adapted to determine:
        (a) a first difference between the obtained first quality value and a first quality target value associated with the data channel, and
        (b) a second difference between the obtained second quality value and a second quality target value associated with the control channel; and
    an adjustment unit, adapted to adjust the gain factor based on the first difference and the second.

11. The arrangement according to claim 10, further comprising:
    a calculator unit, adapted to calculate the number of received acknowledgement (ACK) and/or non-acknowledgement (NACK) during a certain predetermined time period.

* * * * *

UNITED STATES PATENT AND TRADEMARK OFFICE
CERTIFICATE OF CORRECTION

PATENT NO. : 8,422,962 B2
APPLICATION NO. : 12/747614
DATED : April 16, 2013
INVENTOR(S) : Miao et al.

It is certified that error appears in the above-identified patent and that said Letters Patent is hereby corrected as shown below:

In the Specification:

In Column 8, Line 12, delete "$\Delta\beta/3=1$," and insert -- $\Delta\beta=1$, --, therefor.

In the Claims:

In Column 14, Line 51, in Claim 10, delete "second" and insert -- second quality --, therefor.

In Column 14, Line 60, in Claim 10, delete "second." and insert -- second difference. --, therefor.

Signed and Sealed this
Thirteenth Day of August, 2013

Teresa Stanek Rea
*Acting Director of the United States Patent and Trademark Office*